United States Patent [19]

Chapman

[11] Patent Number: 5,312,121
[45] Date of Patent: May 17, 1994

[54] CRANE ARM DOLLY

[75] Inventor: Leonard T. Chapman, North Hollywood, Calif.

[73] Assignee: Leonard Studio Equipment, Inc., North Hollywood, Calif.

[21] Appl. No.: 995,370

[22] Filed: Dec. 24, 1992

[51] Int. Cl.⁵ ............................................. B62B 3/10
[52] U.S. Cl. ............................ 280/47.11; 280/47.34; 280/840; 248/183; 354/293
[58] Field of Search ............ 280/47.11, 47.34, 47.41, 280/840, 87.01, DIG. 1; 180/19.1; 248/183, 188.2, 515; 354/292, 293; 116/215

[56] References Cited

U.S. PATENT DOCUMENTS

| Re. 32,570 | 1/1988 | Conn | 116/215 |
|---|---|---|---|
| 1,686,904 | 10/1928 | Ely | 248/183 |
| 1,943,360 | 1/1934 | Arnold | 248/183 |
| 2,715,534 | 8/1955 | Hoge et al. | 280/47.11 |
| 2,845,719 | 8/1958 | Thomiszer | 182/18 |
| 3,231,227 | 1/1966 | Weining | 248/515 X |
| 4,094,484 | 6/1978 | Galione | |
| 4,249,817 | 2/1981 | Blau | 354/293 |
| 4,257,619 | 3/1981 | Fisher | 280/99 X |
| 4,657,267 | 4/1987 | Jaumann et al. | |
| 4,666,112 | 5/1987 | Jaumann | 354/293 X |
| 4,697,773 | 10/1987 | Jaumann et al. | |
| 4,950,126 | 8/1990 | Fabiano et al. | 280/47.11 X |
| 5,174,593 | 12/1992 | Chapman | 280/47.11 X |

FOREIGN PATENT DOCUMENTS 616414  2/1961  Italy ................................. 354/293

OTHER PUBLICATIONS

The Hybrid dolly brochure, Leonard Studio Equipment, Inc. 1990.
Vintent Complate Range Catalog 1989/90, pp. 4, 5 and 10-13.
J. L. Fisher Inc., Model 9 Camera Dolly Optional Accessories brochure, p. 7.

Primary Examiner—Brian L. Johnson
Attorney, Agent, or Firm—Lyon & Lyon

[57] ABSTRACT

A crane arm dolly for supporting a crane arm carrying a camera includes a post pivotally supported on a dolly chassis. Adjustable post support rods support the post. The support rods can be lengthened or shortened to maintain the post in a vertical position when the crane arm dolly is used on an inclined surface.

5 Claims, 2 Drawing Sheets

CRANE ARM DOLLY

BACKGROUND OF THE INVENTION

The field of the present invention is camera cranes and dollies.

Various camera cranes and dollies have been known and used in the art. The camera crane or dolly is used to provide a stable mobile platform for a motion picture, television or video camera. Camera cranes and dollies may have a column or arm for raising and lowering the camera. For additional vertical or horizontal camera displacement, a crane arm can be used with a camera dolly or crane. However, crane arms require counterbalancing weights which increase the load which must be carried by the camera dolly or crane supporting the crane arm. This increased load can require a larger, heavier dolly or crane resulting in decreased transportability and maneuverability.

SUMMARY OF THE INVENTION

The present invention is directed to a crane arm dolly for supporting a crane arm holding a camera. To this end, a post is attached to a dolly chassis through a universal joint. Adjustable support rods maintain the post in position.

Accordingly, it is an object of the present invention to provide a crane arm dolly. Other and further objects and advantages will appear hereinafter.

BRIEF DESCRIPTION OF THE DRAWINGS

In the drawings, wherein similar reference characters denote similar elements throughout the several views.

DETAILED DESCRIPTION OF THE PREFERRED EMBODIMENT

Figure 1:
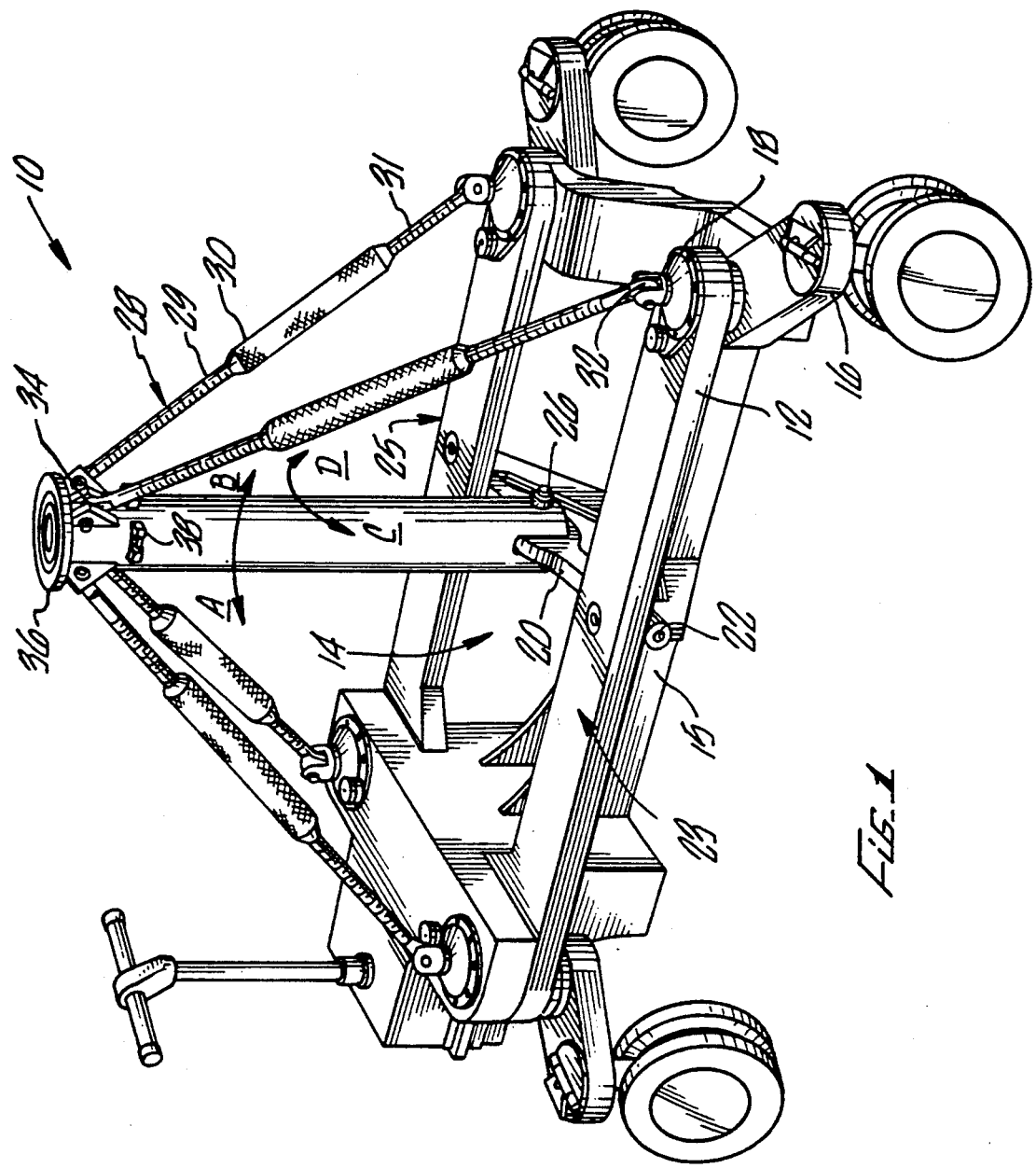
FIG. 1 is a perspective view of the present crane arm dolly.
Figure 2:
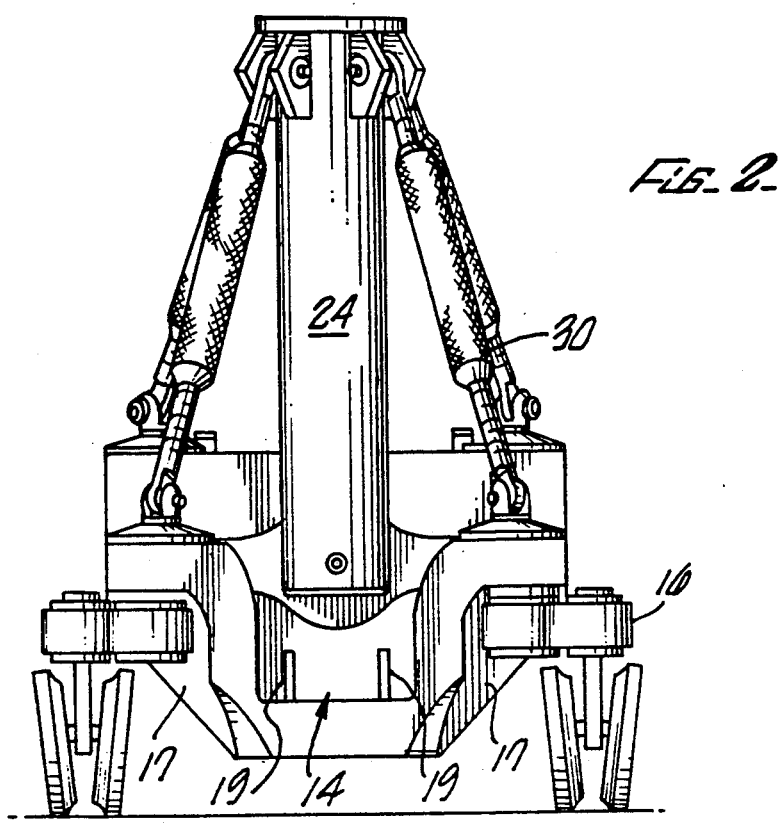
FIG. 2 is a front end view thereof with the crane arm dolly on level ground.

Turning in detail to the drawings, as shown in FIG. 1, the present crane arm dolly 10 includes a dolly chassis 12. The dolly chassis 12 is preferably a HYBRID dolly, from Leonard Studio Equipment, Inc., North Hollywood, Calif., with the dolly arm and hydraulic system removed, leaving a central open space 14. Of course, other dollys may also be used. The legs 16 of the dolly chassis 12 are reinforced, as is the central chassis section 15, and gusset plates 17 and webs 19 are added chassis 12, to increase the weight carrying capacity of the dolly chassis 12. Hollow king pins 18 link the dolly chassis and legs 16 at the front and rear outside corners of the crane arm dolly 10, as is known in the art.

A cross bar 20 extends across the central open space 14, at the central chassis section 15. The cross bar 20 is attached to the dolly chassis 12 by spaced apart cross bar pivot connections 22, with one pivot connection 22 on each side 23, 25 of the dolly chassis 12. A post 24 is pivotally connected to the cross bar 20 by a post pivot connection 26. Consequently, the post 24 can pivot in the front to back direction (indicated by the A-B arrow) as well as in the lateral side to side direction (as indicated by the C-D arrow).

A king pin clevis 32 is pivotally supported within each of the four hollow king pins 18. A post support rod 28 extends from each king pin clevis 32 to a post clevis 34 at the top end of the post 24. A post support rod adjustor 30 is provided on each post support rod 28. The post support rod adjustors 30 can lengthen or shorten the post support rods 28 in a "turnbuckle" manner as the post support ends 29 and 31 have oppositely running left and right hand threads.

A mounting plate 36 is attached at the top of the post 24. Window levels 38 on the post 24 indicate the front to back and side to side inclination of the post.

Figure 3:
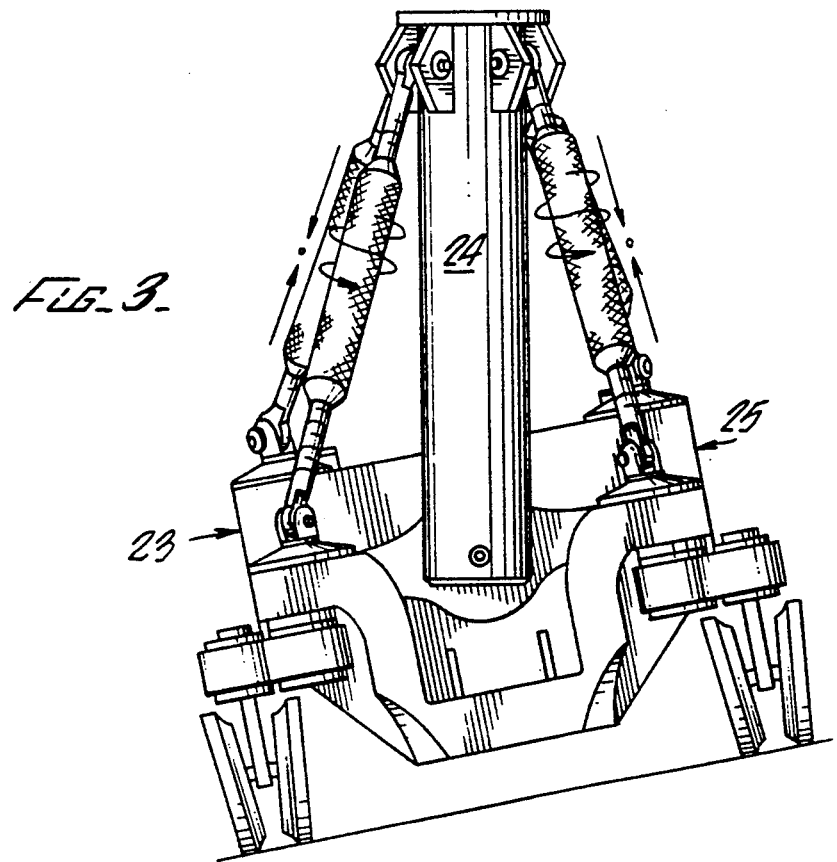
FIG. 3 is a front end view thereof showing the crane arm dolly on inclined ground.

In use, a crane arm is attached to the mounting plate 36. The dolly chassis 12 includes a dolly steering system, such as, for example, the steering systems disclosed in Fabiano, U.S. Pat. No. 4,950,126; and Fisher, U.S. Pat. No. 4,257,619, all incorporated herein by reference. Of course, the HYBRID dolly steering system can also be used. In each steering system, a steering handle steers the dolly wheels via chains and sprockets within the dolly chassis. The crane arm dolly carrying the crane arm and camera is steered and pushed by operators or "grips", to maneuver the camera supported on the end of the crane arm to the desired camera angle position.

Where the crane arm dolly 10 operates on inclined ground, as shown in FIG. 3, the post 24 can be leveled by adjusting the post support rod adjustors 30. Specifically, as shown in FIG. 3, with the right side of the camera arm dolly 10 on inclined ground and raised above the left side, the post support rod adjustors 30 on the left side 23 are turned to lengthen the post support rods 28 on the left side of the dolly, while the post support rod adjustors 30 on the right side of the dolly are turned to shorten the right side post support rods 28, to bring the post 24 to a vertical position. The post support rod adjustors 30 are turned incrementally or simultaneously to prevent binding. The window levels 38 indicate when the post 24 is purely vertical, or the post deviation from vertical. During adjustment of the post 24, each king pin clevis 32 pivots slightly to compensate for post movement and to prevent binding.

Thus, a crane arm dolly is disclosed for use on level and inclined ground. While embodiments and applications of this invention have been shown and described, it would be apparent to those skilled in the art that many more modifications are possible without departing from the inventive concepts herein. The invention, therefore, is not to be restricted except in the spirit of the appended claims.

I claim:

1. A crane arm dolly comprising:
   a dolly chassis;
   a cross bar connected to the dolly chassis and pivotable in a front to back direction relative to the dolly chassis;
   a post connected to the cross bar and pivotable in a side to side direction relative to the dolly chassis; and
   a plurality of post support rods extending from the dolly chassis a top portion of the post.

2. The crane arm dolly of claim 1 further comprising turnbuckle adjustors on each of the post support rods.

3. The crane arm dolly of claim 1 further comprising a window level on the post.

4. The crane arm dolly of claim 1 further comprising a king pin clevis connection between the dolly chassis and each post support rod.

5. The crane arm dolly of claim 1 further comprising a post clevis in between the post and each post support rod.

* * * * *